United States Patent
Jessup et al.

(10) Patent No.: US 7,097,204 B2
(45) Date of Patent: Aug. 29, 2006

(54) SLEEPER BUNK RESTRAINT SYSTEM

(75) Inventors: Chris P. Jessup, Sheridan, IN (US); Douglas Wayne Bittner, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 10/200,394

(22) Filed: Jul. 22, 2002

(65) Prior Publication Data
US 2004/0012183 A1   Jan. 22, 2004

(51) Int. Cl.
*B60R 21/02* (2006.01)

(52) U.S. Cl. ............... 280/748; 280/749; 297/464; 296/24.33; 296/24.43; 5/118

(58) Field of Classification Search ........... 280/748, 280/749; 297/464, 487, 488, 485, 489; 296/24.33, 296/24.4, 24.43; 5/118, 424, 425, 430, 94; 197/488, 485
See application file for complete search history.

(56) References Cited

U.S. PATENT DOCUMENTS

| | | | |
|---|---|---|---|
| 1,336,943 A | | 4/1920 | Crane |
| 3,648,306 A | * | 3/1972 | Auerbach ............... 5/94 |
| 3,695,698 A | * | 10/1972 | Trump ............... 297/487 |
| 3,887,229 A | * | 6/1975 | Plume ............... 297/65 |
| 4,292,698 A | * | 10/1981 | Acker ............... 5/45 |
| 4,368,902 A | * | 1/1983 | McDowell ............... 280/749 |
| 4,487,451 A | * | 12/1984 | Fiorini ............... 297/219.1 |
| 4,509,788 A | * | 4/1985 | Jan et al. ............... 296/24.46 |
| 4,512,286 A | * | 4/1985 | Rux ............... 119/771 |
| 4,943,105 A | * | 7/1990 | Kacar et al. ............... 296/24.31 |
| 5,375,879 A | * | 12/1994 | Williams et al. ............... 280/749 |
| 5,529,341 A | * | 6/1996 | Hartigan ............... 280/749 |
| 5,536,042 A | * | 7/1996 | Williams et al. ............... 280/749 |
| 5,632,520 A | * | 5/1997 | Butz ............... 296/24.43 |
| 5,690,355 A | * | 11/1997 | Kleinberg ............... 280/730.1 |
| 5,876,059 A | * | 3/1999 | Kleinberg ............... 280/730.1 |
| 6,004,084 A | * | 12/1999 | Moker ............... 410/118 |
| 6,015,186 A | * | 1/2000 | Grieger ............... 297/67 |
| 6,217,068 B1 | * | 4/2001 | Trainum et al. ............... 280/801.1 |
| 6,217,069 B1 | * | 4/2001 | Ganesan ............... 280/801.1 |
| 6,367,839 B1 | * | 4/2002 | Langhoff ............... 280/751 |
| 6,405,391 B1 | * | 6/2002 | Hakansson ............... 5/118 |
| 6,428,044 B1 | | 8/2002 | Chantae |
| 6,439,636 B1 | * | 8/2002 | Kuo ............... 296/65.09 |

FOREIGN PATENT DOCUMENTS

| | | |
|---|---|---|
| EP | 0 415 041 | 3/1991 |
| EP | 1 069 031 | 1/2001 |
| WO | WO 02/16172 | 2/2002 |

OTHER PUBLICATIONS

European Search Report dated Jan. 28, 2005 (2 sheets).

* cited by examiner

*Primary Examiner*—Gene O. Crawford
*Assistant Examiner*—Rashmi Sharma
(74) *Attorney, Agent, or Firm*—Barnes & Thornburg LLP

(57) ABSTRACT

A sleeper bunk restraining system includes a sleeper bunk configured to be carried by a vehicle and having a top surfaced defining a length upon which an occupant may rest. The bunk includes a stationary portion and a moveable portion defined along the length, and the moveable portion is movable toward the stationary portion to form an occupant restraining barrier. A restraining member may be included and is configured for releasable connection to the vehicle such that the restraining member restrains movement of the movable portion of the bunk relative to the stationary portion of the bunk to thereby maintain the occupant restraining barrier in an occupant restraining position.

21 Claims, 7 Drawing Sheets

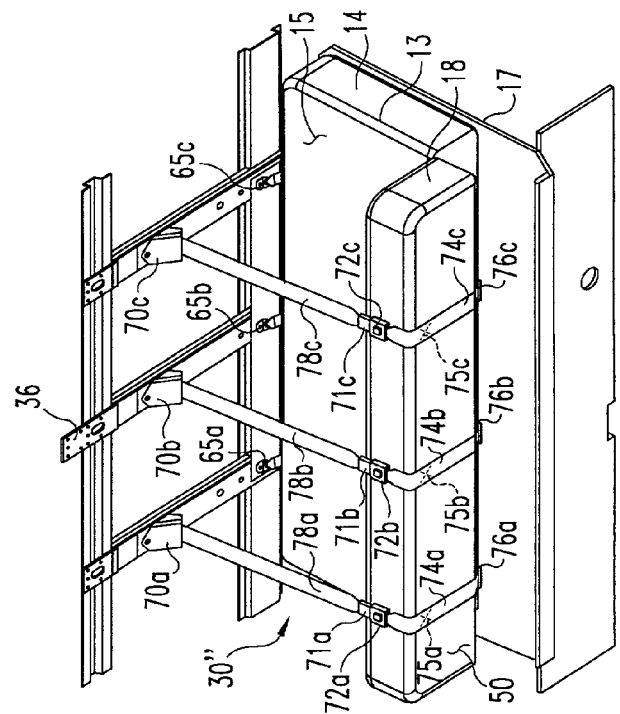
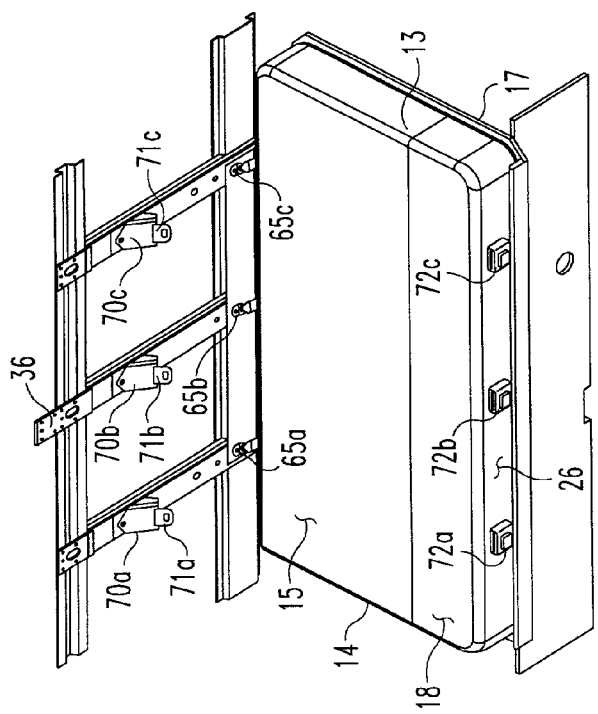
Fig. 7B
Fig. 7A

SLEEPER BUNK RESTRAINT SYSTEM

BACKGROUND OF THE INVENTION

1. Field of the Invention

The present invention relates generally to restraint systems for sleeping bunk arrangements, and more specifically to restraint systems for sleeping bunk arrangements carried by a motor vehicle.

2. Description of the Prior Art

A variety of bunks have been provided for use in motor vehicles, such as in the cabs of trucks. For example, the commonly owned U.S. Pat. Nos. 5,375,879 and 5,536,042 both disclose bunks having different types of restraint systems. Other bunks having nets extending upwardly from the front of the bunk are disclosed in the U.S. Pat. Nos. 3,695,698; 6,405,391; 6,367,839; and 5,529,341. A seat belt harness assembly for securing a person in a prone position atop a conventional vehicle seat is disclosed in the U.S. Pat. No. 6,217,069. The U.S. Pat. No. 4,943,105 discloses an automobile pet set having a U shape for positioning atop a vehicle set with a forward wall extending upwardly to limit forward movement of the pet.

It is desirable to provide a sleeper bunk configured to be carried by a motor vehicle and usable without direct occupant restraints. It is further desirable to provide such a bunk with suitable indirect occupant restraints operable to maintain an occupant in the bunk when the vehicle is in motion and/or in the event of sudden vehicle deceleration.

SUMMARY OF THE INVENTION

The present invention comprises one or more of the following features or combinations thereof. A bunk having a movable portion that is movable toward the remainder of the bunk to provide an occupant restraint barrier. The bunk may take any of a variety of forms, and may be implemented, for example, as a two-piece bunk having a stationary main portion and a movable portion movable relative to the stationary portion. As another example, the bunk may be implemented as a unitary flexible bunk having a movable portion that is bendable relative to a fixed or stationary portion. In any case, a bunk restraint mechanism may be included for maintaining the movable portion of the bunk in an occupant restraining position. The bunk restraining mechanism may be attached at one end to the bunk and at an opposite end to a suitable structural component of the vehicle, such as, a rear wall or ceiling, for example. The bunk restraint mechanism may alternatively be configured for attachment to a suitable vehicle structure or structures in a manner that cradles the bunk therein to thereby maintain the movable portion of the bunk in the occupant-restraining position. The bunk restraining mechanism may or may not include a curtain configured to extend over or adjacent to the bunk.

These and other features of the present invention will become more apparent from the following description of the illustrative embodiments.

BRIEF DESCRIPTION OF THE DRAWINGS

FIG. 7A is an enlarged perspective view of the bunk of FIG. 2 illustrating another alternate embodiment of the bunk restraining structure with the bunk shown in the fully extended and non-restraining position.

FIG. 7B is a perspective view of the bunk and bunk restraining structure of FIG. 7A with the bunk in the occupant restraining position.

DESCRIPTION OF THE ILLUSTRATIVE EMBODIMENTS

Figure 1:
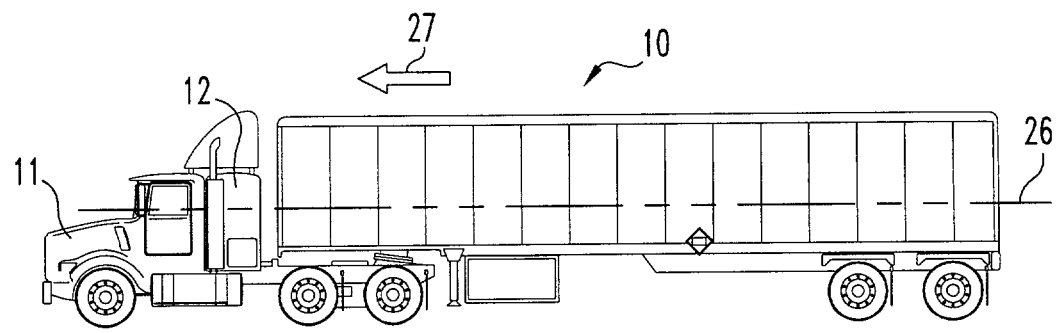
FIG. 1 is a side view of a tractor-trailer including a sleeper cab.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring now to FIG. 1, there is shown a truck 10 of the tractor-trailer type. The tractor portion 11 typically includes a sleeper cab 12 located behind the driver for a person or persons to occupy when the truck is in motion or at rest.

Sleeper cabs have a variety of couches or bunks provided therein. Shown in FIG. 2, for example, is a bunk 13 mounted within cab 12. Bunk 13 includes a main or stationary portion 14 having an upwardly facing surface 15 upon which a person 16 may rest. Stationary portion 14 typically is a mattress and is fixed by conventional means to frame 17 which is, in turn, secured to the truck frame. It will be appreciated that although the bunk 13 is illustrated herein as being mounted within the sleeper cab 12 of a truck 10, the bunk 13 may alternatively be provided in, or carried by, a variety of motor vehicles.

Bunk 13 further includes a movable portion 18 that serves as a barrier or berm restricting movement of an occupant of the bunk 13 in the direction of movable portion 18. In the illustrated embodiment, movable portion 18 is pivotally mounted by conventional means, such as a hinge 19 extending between and connecting movable portion 18 with the stationary main portion 14. For example, end wall 20 of stationary portion 14 along with end wall 21 of movable portion 18 may be produced from an inflexible material thereby allowing for the mounting of hinge 19 to walls 20 and 21. It will be appreciated, however, that the structure of the walls 20 and 21 may alternatively be flexible or somewhat flexible, and that the coupling between the walls may be flexible to provide a hinge or pivotal type of movement of movable portion 18 relative to the stationary portion 14. Furthermore, the connection providing the movement of the movable portion 18 may take various forms which will permit the movable portion 18 to be raised to provide a barrier adjacent to the stationary portion 14.

Figure 3:
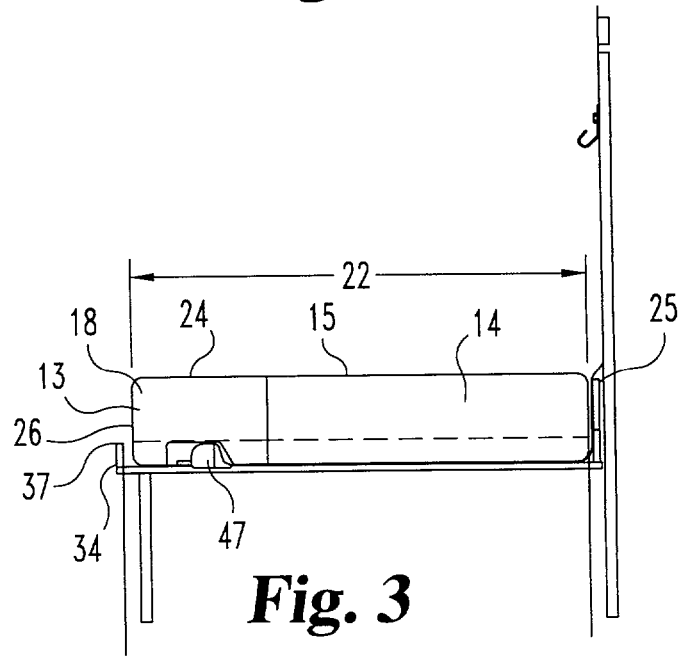
FIG. 3 is the same view as FIG. 2 only showing the bunk in a fully extended and non-restraining position.

When the movable portion 18 is in the downward position shown in FIG. 3, the upwardly facing surface 24 of movable portion 18 is illustratively parallel and aligned with the upwardly facing surface 15 of the stationary portion 14. Thus, the usable width or occupant-supporting surface of the bunk is composed of surfaces 15 and 24 with the width 22 extending from the rear 25 of the bunk to the front 26 of the bunk. Thus, the bunk is provided with a maximum width of upwardly supporting surface and may be used not only as a bunk but as a chair or couch.

Figure 2:
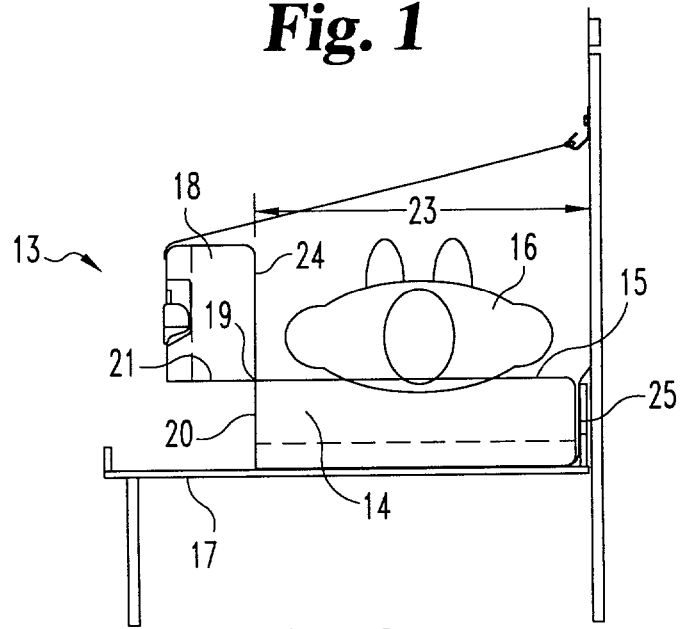
FIG. 2 is an end elevational view of one illustrative embodiment of an occupant restraining bunk located in the sleeper cab and configured in an occupant restraining position.

When movable portion 18 is moved to the upward position shown in FIG. 2, surface 24 extends generally upwardly away from surface 15, and in one embodiment is arranged substantially perpendicular to surface 15. The usable width 23 of the bunk extending from the rear 25 of the bunk to surface 24 is less than width 22 with movable portion 18 providing a barrier to movement of the occupant on surface 15 in the direction of the longitudinal axis 26 (FIG. 1) of the vehicle. Surfaces 15 and 24 extend generally horizontal and parallel with axis 26 when the movable portion 18 is in the downward position. The normal direction of travel of the vehicle is shown by arrow 27 along axis 26.

Figure 4:
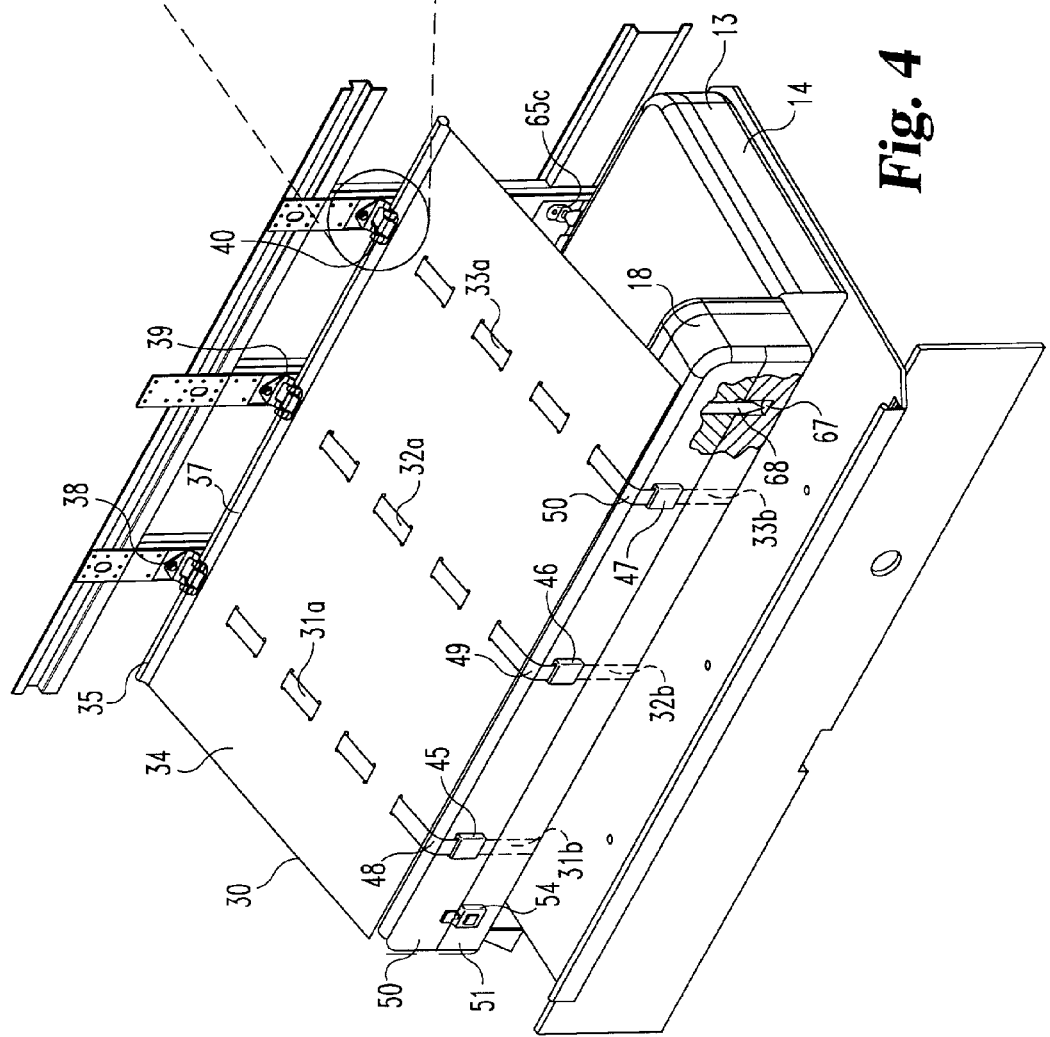
FIG. 4 is an enlarged perspective view of the bunk of FIG. 2 illustrating one embodiment of a bunk restraining structure.
Figure 6:
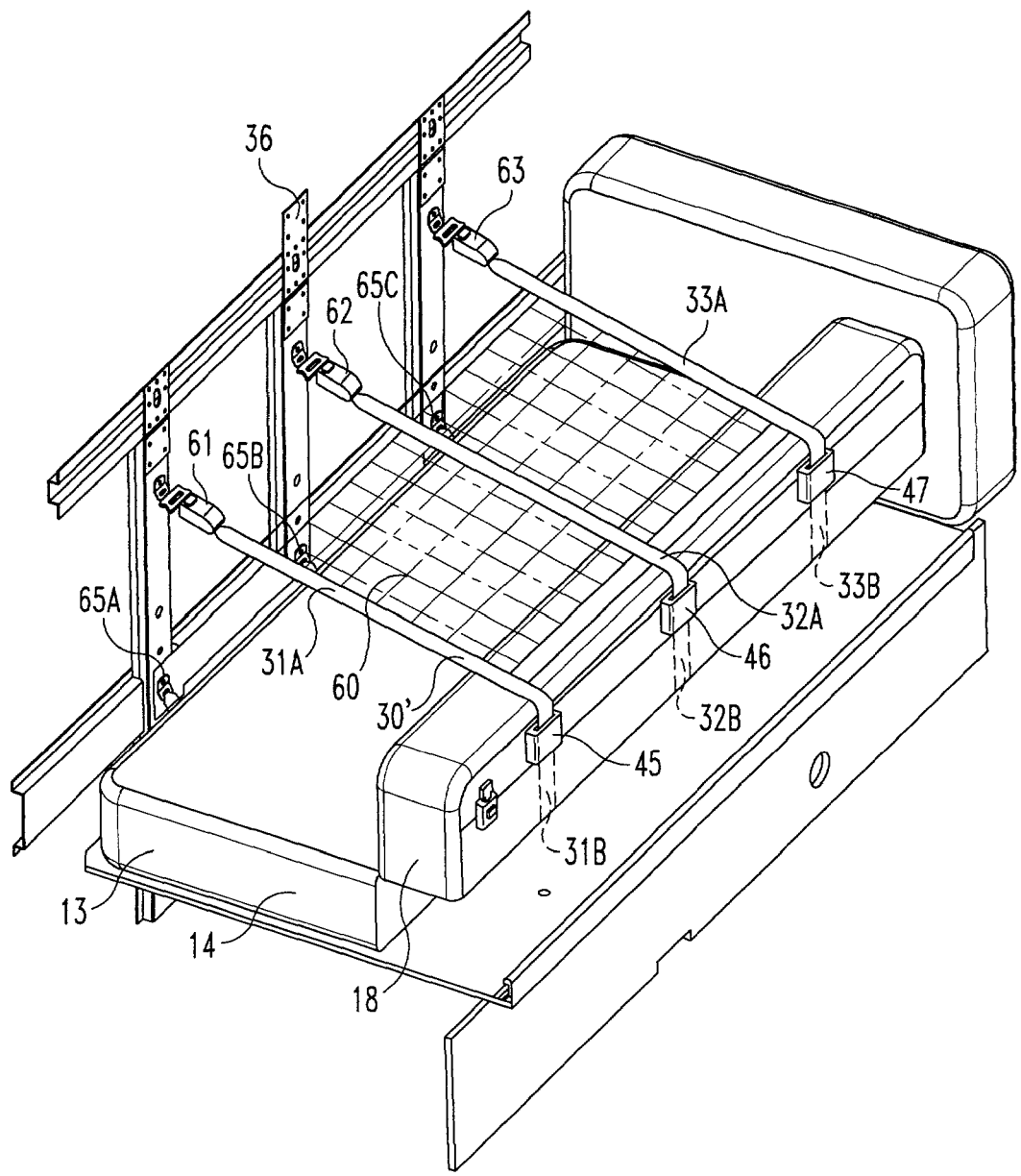
FIG. 6 is an enlarged perspective view of the bunk of FIG. 2 illustrating an alternate embodiment of the bunk restraining structure.

Referring now to FIG. 4, one illustrative embodiment of a restraint 30 is shown extendable upwardly from the movable portion 18 over the stationary or main portion 14. Restraint 30 may take a variety of configurations, and in the illustrated embodiment shown in FIG. 4, three webs or straps 31a, 32a and 33a are coupled to a flexible, solid fabric curtain 34. In an alternate embodiment, as illustrated in FIG. 6, the three straps of an alternate restraint 30' are coupled to a curtain 60 formed from a net-like material. It will be appreciated that either curtain 34 or curtain 60 may alternatively be formed of other suitable flexible, or at least partially flexible, material or materials including, but not limited to, any solid or net-like composition of leather, vinyl, fabric, and/or any combination thereof.

The distal end 35 of the restraint 30 is releasably connectable to the vehicle, e.g., the rear wall 36 of the cab, via any number of known fastening mechanisms. In FIG. 4, for example, the distal end 35 of restraint 30 is illustrated as including a rod 37 extending across the restraint 30, wherein portions of the distal end 35 and rod 37 combinations are configured to engage three spaced apart hook-shaped brackets or connectors 38, 39 and 40 mounted to the rear wall 36 of the vehicle.

Figure 5:
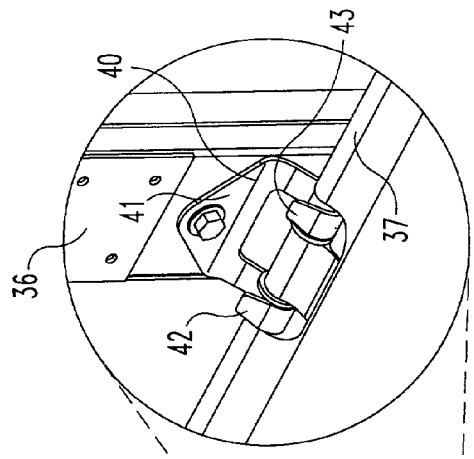
FIG. 5 is an enlarged perspective view of one of the restraint mechanisms illustrated in FIG. 4.

Brackets 38–40 may be identical and thus the following description relative to bracket 40 applies equally to brackets 38 and 39. Bracket 40 (FIG. 5) has a mounting wall 41 mounted to the rear cab wall 36. Wall 41 includes a pair of spaced apart and upwardly turned fingers 42 and 43 complimentarily receiving rod 37. Thus, to releasably connect the restraint 30 to brackets 38–40, rod 37 is moved upwardly atop the fingers of each bracket and then moved downwardly into engagement with the fingers of each bracket. For example, as shown in FIG. 5, rod 37 may be moved upwardly over fingers 42 and 43 and then moved downwardly between these fingers and wall 41 into secure engagement with bracket 40.

Three retractors 45, 46 and 47 receive respectively the proximal ends 48, 49 and 50 of webs or straps 31a, 32a and 33a with the retractors operable to retract the straps therein thereby collapsing restraint 30 once rod 37 is disengaged from clamps 38–40. The retractors may further be spring biased and yieldable to allow extension of the straps therefrom as restraint 30 is pulled upwardly from movable portion 18 and over bunk portion 14, thereby allowing the fastening of rod 37 to clamps 38–40. The retractors may be conventional retracting devices, including, for example, automatic locking retractors or inertia locking retractors. Alternatively or additionally, as shown in phantom in FIGS. 4 and 6, webs 31b, 32b and 33b may be also be attached to and extend from retractors 45, 46 and 47 respectively, under the bunk 13 and into engagement with corresponding brackets 65a, 65b and 65c mounted to the rear wall 36 of the vehicle, to thereby facilitate securing bunk 13 in the position illustrated in FIGS. 4 and 6. Alternatively still, retractors 45, 46 and 47 may be mounted to the frame 17 adjacent to the movable portion 18 of bunk 13, wherein such retractors may or may not be further connected to the rear wall 36 or other vehicle structure via webs 31b, 32b and 33b as just described.

In the embodiment illustrated in FIGS. 4 and 6, retractors 45–47 are fixedly mounted to wall 50 of the movable portion 18 of bunk 13, in turn, releasably connected by a quick release mechanism 54 mounted to wall 51. Wall 51 is fixedly mounted to the movable portion 18 and extends generally vertically when the movable portion 18 is in the upward position corresponding to FIGS. 2 and 4. In the embodiment depicted in FIG. 4, wall 51 includes channels or holes 67 that removably receive rods 68 fixedly mounted to and extending from board 50. The quick release mechanism may include a buckle/tongue combination 54 with, for example, the buckle mounted to wall 51 and the tongue mounted to wall 50. Thus, a quick release capability is provided whereby buckle 54 may be unlocked and wall 50 may be pulled upwardly along with retractors 45–47 and restraint 30. A variety of quick release mechanisms 54 may be utilized along with a variety of restraints 30.

In the embodiment of FIG. 6, the solid flexible curtain 34 is replaced with a net-like curtain 60 coupled to straps 31a–33a that are received by retractors 45–47 mounted to the movable portion 18. Instead of rod 37 mounted to the distal ends of straps 31–33, three conventional buckles 61–63 are mounted thereto and are releasably lockable with conventional tongues mounted to the back wall 36. Alternatively, conventional tongues are mounted to the distal ends of straps 31–33 and three conventional buckles 61–63 are mounted to back wall 36.

Referring now to FIGS. 7A and 7B, another illustrative embodiment of a restraint 30" is illustrated. In this embodiment, a number of conventional retractors 70a, 70b and 70c are mounted to the rear wall 36, and a corresponding number of webs or straps 78a, 78b and 78c are mounted at one end to these retractors, and define buckle-engaging tongues 71a, 71b, and 71 at their opposite ends. A corresponding number of conventional buckles 72a, 72b and 72c may be mounted to frame 17 via mounting brackets 76a, 76b or 76c, or may alternatively be attached to the underside wall 50 of the movable portion 18 of the bunk 13 via known means as illustrated in phantom by attachment locations 75*a*, 75*b* and 75*c*. In one embodiment, for example, mounting brackets 76*a*, 76*b* and 76*c* may represent conventional retractors having retractable webs or straps 74*a*, 74*b*, and 74*c* extending between the respective retractors and buckles 72*a*, 72*b* and 72*c*. In this embodiment, webs 78*a*, 78*b* and 78*c* are fixed-length webs so that the tongues 71*a*, 71*b* and 71*c* may be engaged with corresponding buckles 72*a*, 72*b* and 72*c* such that the movable portion 18 of bunk 13 is cradled by straps 74*a*, 74*b* and 74*c* and thereby secured in the position illustrated in FIG. 7B. In another embodiment, mounting brackets 76*a*, 76*b* and 76*c* may represent conventional, fixed-position mounting brackets having fixed-length webs or straps 74*a*, 74*b* and 74*c* respectively connected thereto. In this embodiment, webs 78*a*, 78*b* and 78*c* are fixed-length or adjustable webs so that the tongues 71*a*, 71*b* and 71*c* may be engaged with corresponding buckles 72*a*, 72*b* and 72*c* such that the movable portion 18 of bunk 13 is cradled by straps 74*a*, 74*b* and 74*c* and thereby secured in the position illustrated in FIG. 7B. In still another embodiment, webs or straps 74*a*, 74*b* and 74*c* are attached via conventional means to wall 50 of the movable portion 18 of bunk 13 at 75*a*, 75*b* and 75*c* respectively, and mounting brackets 76*a*, 76*b* and 76*c* may be omitted. In this embodiment, webs 78*a*, 78*b* and 78*c* are fixed-length or adjustable webs so that the tongues 71*a*, 71*b* and 71*c* may be engaged with corresponding buckles 72*a*, 72*b* and 72*c* such that the movable portion 18 of bunk 13 is secured in the position illustrated in FIG. 7B.

Figure 8B:
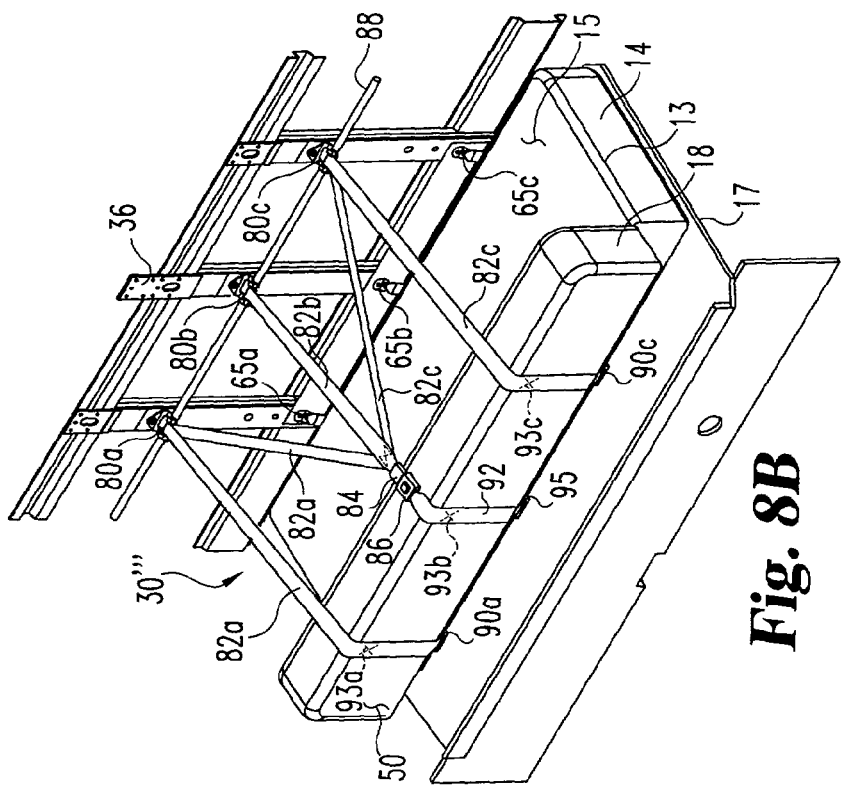
FIG. 8B is an enlarged perspective view of the bunk of FIG. 2 illustrating yet another alternate embodiment of the bunk restraining structure with the bunk in the occupant restraining position.
Figure 8A:
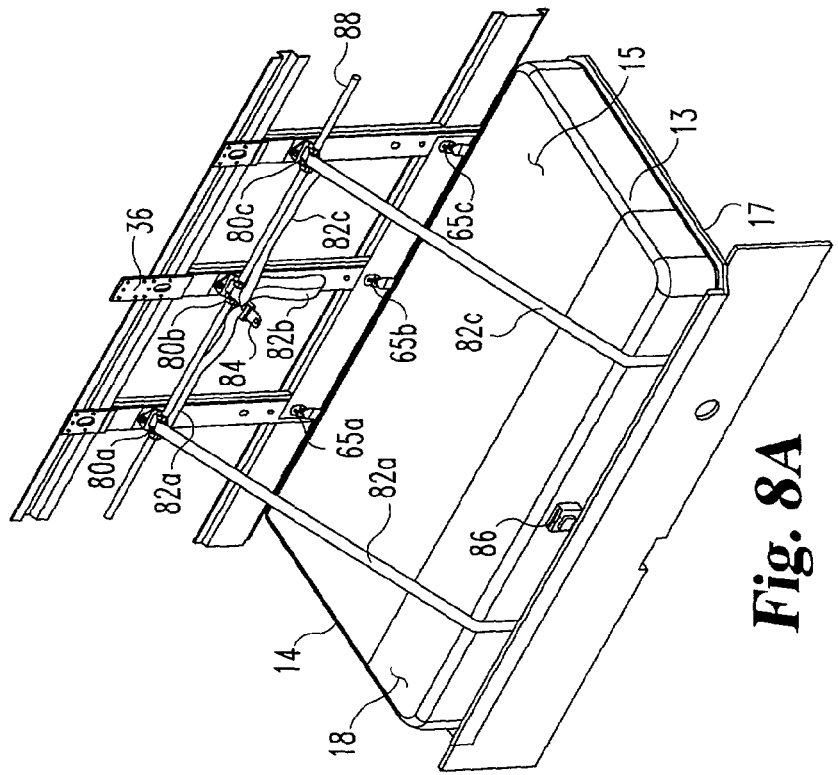
FIG. 8A is a perspective view of the bunk and bunk restraining structure of FIG. 8B with the bunk shown in the fully extended, non-restraining position and the quick release harness having been released.

Referring now to FIGS. 8A and 8B, another illustrative embodiment of a restraint 30''' is illustrated. Restraint 30''' may or may not include a quick release mechanism as will be described subsequently. In one embodiment of restraint 30''', as illustrated in its restraining position in FIG. 8B, includes a number of conventional brackets 80*a*, 80*b* and 80*c* mounted to the rear wall 36. In this embodiment, brackets 80*a*, 80*b* and 80*c* may be identical to brackets 38, 39 and 40 illustrated and described with respect to FIG. 4, and may therefore be configured to releasably engage rod 88. It will be appreciated, however, that brackets 80*a*, 80*b* and 80*c* need not be identical to brackets 38, 39 and 40, and may instead by any conventional brackets configured to engage rod 88 similarly as described hereinabove. In any case, bracket 80*b* is attached to one end of a fixed-length or adjustable web or strap 82*b* having an opposite end affixed to a buckle-engaging tongue 84. A corresponding buckle 86 may be mounted to frame 17 via mounting bracket 95, or may be alternatively be mounted directly to wall 50 of the movable portion 18 of bunk 13 at 93*b*, via web or strap 92. In one embodiment of restraint 30''', first and second retractors 90*a* and 90*c* are mounted to frame 17 on either side of mounting bracket 95, wherein retractors 90*a* and 90*c* have retractable webs or straps 82*a* and 82*c* having first ends attached to retractors 90*a* and 90*c* respectively, and opposite second ends extending through corresponding brackets 80*a* and 80*c* and attached to tongue 84. In this embodiment, webs 82*a* and 82*c* are variable or fixed length webs, and in either case, the movable portion 18 of bunk 13 is secured in the occupant restraining position illustrated in FIG. 8B by first engaging rod 88 with brackets 80*a*, 80*b* and 80*c*, and then advancing the tongue 84 into engagement with buckle 86. Alternatively, tongue 84 may be engaged with buckle 86 before engaging rod 88 with brackets 80*a*, 80*b* and 80*c*. In another embodiment of restraint 30''', structures 90*a* and 90*c* may represent conventional, fixed-position mounting brackets, and webs or straps 82*a* and 82*c* are likewise fixed-length webs or straps. In still another embodiment, webs or straps 92*a* and 92*c* are attached via conventional means to wall 50 of the movable portion 18 of bunk 13 at 93*a* and 93*c* respectively, and mounting brackets 90*a* and 90*c* may be omitted. It is to be understood that in any of the embodiments of restraint 30''' just described, web or strap 92 may be attached to frame 17 via mounting bracket 95, or alternatively attached directly to wall 50 of the movable portion 18 of bunk 13 at 93*b*, in which case mounting bracket 95 may be omitted, or alternatively still structure 95 may represent a conventional retractor in which case strap 92 may be fixed or variable length. In any case, restraint 30''' is in its occupant restraining position when rod 88 is engaged with brackets 80*a*, 80*b* and 80*c* and tongue 84 is engaged with buckle 86, as illustrated in FIG. 8B. In this embodiment, buckle 86 acts as a quick release mechanism such that buckle 86 may be actuated to release tongue 84 therefrom, which causes tongue 84 to move toward bracket 80*b* thereby introducing slack into webs or straps 82*a* and 82*c*, thereby lowering the movable portion 18 of bunk 13 to its non-restraining position as illustrated in FIG. 8A.

Figure 9B:
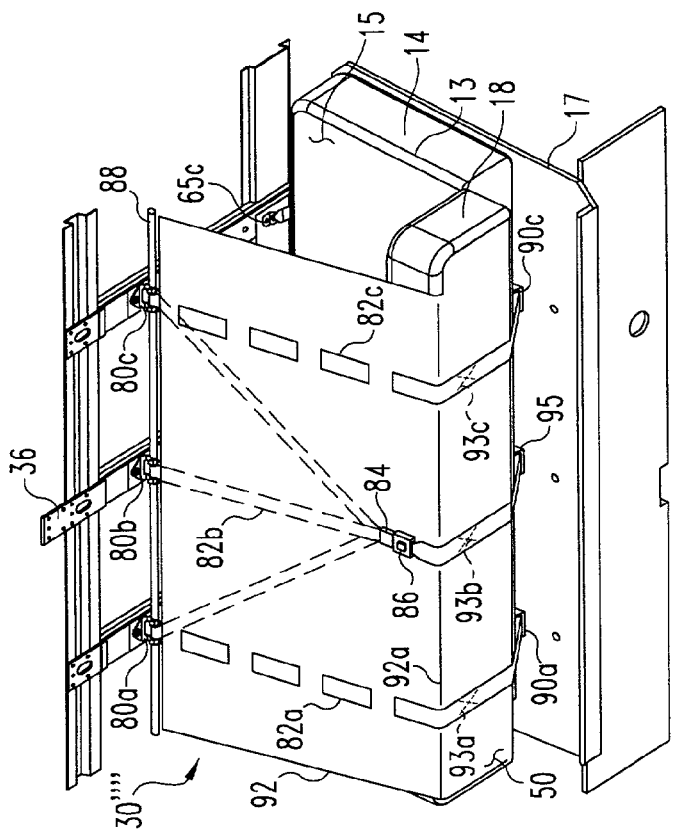
FIG. 9B is a perspective view of the bunk and bunk restraining structure of FIG. 9A with the bunk in the occupant restraining position.
Figure 9A:
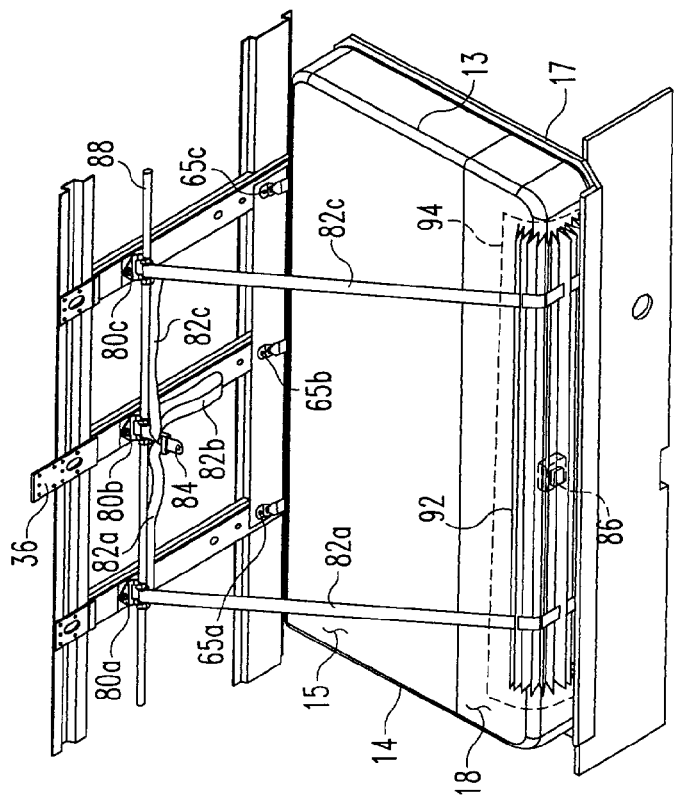
FIG. 9A is an enlarged perspective view of the bunk of FIG. 2 illustrating a further alternate embodiment of the bunk restraining structure with the bunk shown in the fully extended and non-restraining position.

Referring now to FIGS. 9A and 9B, yet another illustrative embodiment of a restraint 30''' is illustrated. This embodiment is identical in many respects to the restraint 30''' illustrated and described with respect to FIGS. 8A and 8B, and like numbers are therefore used to identify like components. Structural and functional descriptions of such identical components will, however, be omitted here for brevity. In this embodiment, a curtain 92 is attached at one end 92*a* to the movable portion 18 of bunk 13. Curtain 92 may be a solid, mesh or net-like flexible material as described hereinabove with respect to FIGS. 4 and 6. In any case, webs or straps 82*a* and 82*c* are coupled to curtain 92 prior to being looped through brackets 80*a* and 80*c* respectively, whereas webs or straps 82*a* and 82*c* after being looped through brackets 80*a* and 80*c*, as well as web or strap 82*b*, travel along curtain 92 on the bunk side thereof for releasable engagement with buckle 86. As most clearly illustrated in FIG. 9A, curtain 92 is configured to fold (e.g., in corrugated fashion) adjacent to the movable portion 18 of the bunk 13 when the tongue 84 is released from the buckle 86 such that the movable portion 18 moves to its downward, occupant non-restraining position. Optionally, as shown in phantom in FIG. 9A, a curtain housing 94 may be positioned adjacent to the movable portion 18 and mounted to frame 17 such that curtain 92 is received within, or adjacent to, housing 94 in its folded or retracted position.

In alternate embodiments of the restraint 30''' or 30'''' illustrated in either of FIGS. 8A and 8B or 9A and 9B, rod 88 may be omitted, brackets 80*a*, 80*c* may be conventional brackets having through-holes or slots for receiving therethrough webs or straps 82*a* and 82*c* respectively, and bracket 80*b* may be a conventional bracket configured to secure web or strap 82*b* (either fixed length or adjustable) to wall 36. In this embodiment, the occupant non-restraining position of bunk 13 and restraint 30''' or 30'''' is as illustrated in FIGS. 8A and 9A with the movable portion 18 of bunk 13 in its downward non-restraining position and with webs or straps 82*a* and 82*c* extending across bunk 13 as shown. Restraint 30''' and 30'''', along with bunk 13, may be moved to their occupant restraining positions, in this embodiment, simply by engaging tongue 84 with buckle 86, as substantially illustrated in FIGS. 8A and 8B.

Figure 10:
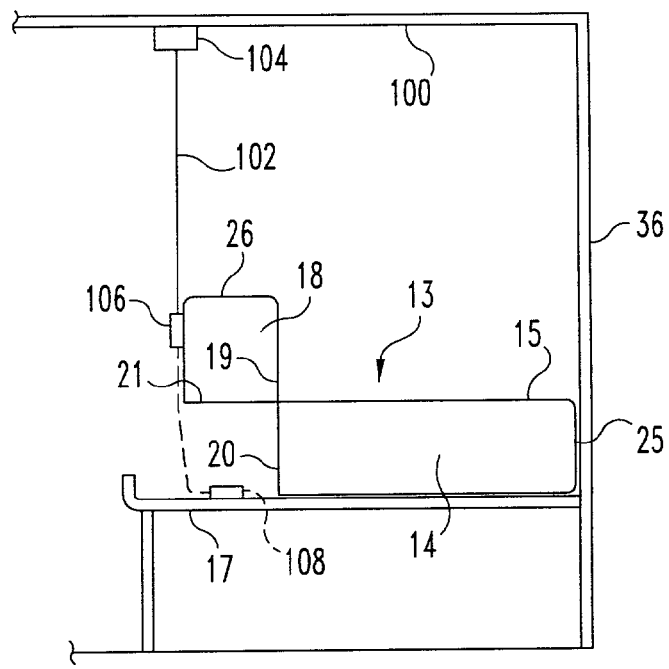
FIG. 10 is an end elevational view of the occupant restraining bunk similar to that of FIG. 2 illustrating an alternate embodiment of a bunk restraining structure.

Referring now to FIG. 10, an alternate embodiment of a bunk restraining structure is illustrated. This embodiment is identical in many respects to the bunk restraining structure illustrated in FIG. 2, and like numbers are therefore used to identify like components. For example, bunk 13 is shown supported by frame 17 of a vehicle, with the movable portion of bunk 13 in its occupant restraining position as illustrated in FIG. 2. In this embodiment, a web or strap 102 is connected at one end to a retractor, bracket or other attachment structure 106 affixed or mounted to the movable portion 18 of bunk 13, or is alternatively connected at this end to a retractor, bracket of other attachment structure 108 affixed to frame 17, as described in any one or more of the embodiments illustrated and described herein. Unlike the various embodiments illustrated and described thus far, the opposite end of web or strap 102 is not attached to the rear wall 36 of the vehicle but is instead attached to a retractor, bracket or other suitable attachment mechanism affixed to a ceiling or roof 100 of the vehicle. As in previously described embodiments, the web or strap 102 and attachment structures 104, 106 and/or 108 in this embodiment are configured to maintain the movable portion 18 of bunk 13 in the occupant restraining position illustrated in FIG. 10.

Figure 11:
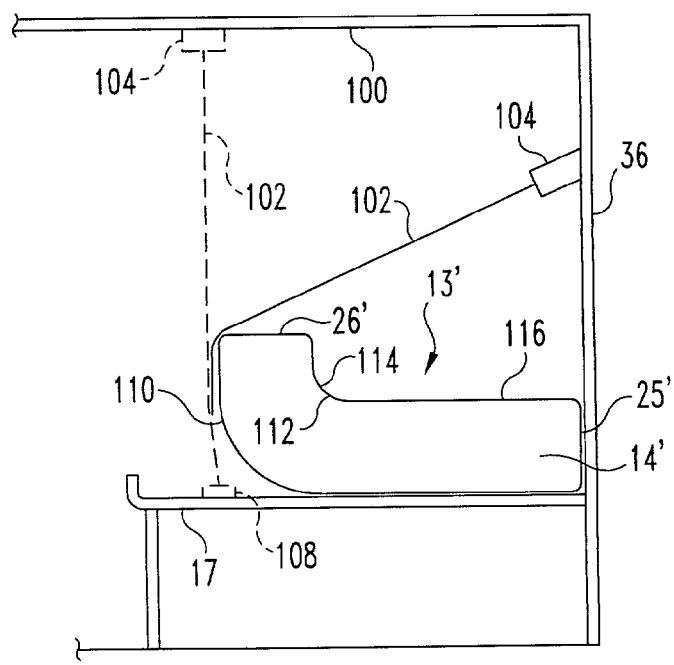
FIG. 11 is an end elevational view of an alternate embodiment of an occupant restraining bunk located in the sleeper cab and configured in an occupant restraining position.

Referring now to FIG. 11, an alternate embodiment of a bunk 13' is illustrated. In this embodiment, bunk 13' is a unitary but flexible structure having a stationary portion 14' defining a top surface 116 and a bunk end 25' abutting wall 36, and a movable portion 110 defining a top surface 116 terminating at an opposite bunk end 26'. The bunk 13' is bendable at bend location 112 such that surface 114 extends generally upwardly and away from surface 116 to form an occupant restraining barrier between end 26' and bend location 112. Any one or combination of the bunk restraining structures described hereinabove may be used to maintain the movable portion 110 of bunk 13' in the illustrated occupant-restraining position, including any of those that attach to the rear wall 36, the ceiling or roof 100 or any other vehicle structure. In this embodiment, bunk 13' may be a conventional flexible mattress, or may instead be a flexible bunk configured to facilitate bending along bending location 112.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A sleeper bunk restraining system comprising:
    a sleeper bunk configured to be carried by a vehicle and defining a length extending generally transverse relative to a direction of travel of the vehicle, the bunk including a stationary portion having a first top surface and a movable portion defined along the length and having a second top surface, the movable portion movable relative to the stationary portion along the length between a first position with the first and second top surfaces together defining an occupant-supporting surface of the bunk and an occupant restraining position with the movable portion forming an occupant restraining barrier relative to the stationary portion for restraining occupant movement toward the direction of travel, and
    a restrainer including at least one elongated web configured to extend over the stationary portion and engage the movable portion to secure the movable portion in the occupant restraining position when the vehicle is traveling, the at least one elongated web having one end configured to be connected to the vehicle.

2. The sleeper bunk restraining system of claim 1 wherein the restrainer includes:
    a number of elongated webs each configured to secure the movable portion of the bunk in the occupant restraining position, and
    a curtain connected to each of the number of elongated webs, the curtain defining a connecting end configured to be connected to the vehicle.

3. The sleeper bunk restraining system of claim 2 wherein the curtain is formed of a solid flexible material.

4. The sleeper bunk restraining system of claim 2 wherein the curtain is formed of a flexible net-like material.

5. The sleeper bunk restraining system of claim 2 further including a curtain housing positioned adjacent to the movable portion of the bunk, the curtain being received within the curtain housing when the connecting end of the curtain is not connected to the vehicle.

6. The sleeper bunk restraining system of claim 1 wherein the at least one elongated web has a first end configured to be connected to the vehicle adjacent to the movable portion of the bunk and a second end configured to be connected to the vehicle, the at least one elongated web cradling the movable portion of the bunk therein when the first and second ends of the at least one elongated web are connected to the vehicle to secure the movable portion in the occupant restraining position.

7. The sleeper bunk restraining system of claim 1 wherein the restrainer includes:
    a plurality of retractors mounted to the movable portion of the bunk in spaced apart relationship, each of the plurality of retractors including an elongated web having one end connected thereto and an opposite end defining a tongue, and
    a corresponding plurality of buckles configured to be connected to the vehicle, each of the plurality of buckles configured to releasable engage a tongue of a corresponding one of the plurality of retractors.

8. The sleeper bunk restraining system of claim 1 wherein the restrainer includes:
    a plurality of retractors configured to be mounted to the vehicle adjacent to the movable portion of the bunk in spaced apart relationship, each of the plurality of retractors including an elongated web having one end connected thereto and an opposite end defining a tongue, and
    a corresponding plurality of buckles configured to be connected to the vehicle, each of the plurality of buckles configured to releasably engage a tongue of a corresponding one of the plurality of retractors such that one or more of the elongated webs cradle the movable portion of the bunk therein when the buckles engage the tongues.

9. The sleeper bunk restraining system of claim 1 wherein the restrainer includes:
    a plurality of retractors configured to be mounted to the vehicle in spaced apart relationship, each of the plurality of retractors including an elongated web having one end connected thereto and an opposite end defining a tongue, and
    a corresponding plurality of buckles mounted to the movable portion of the bunk in spaced apart relationship, each of the plurality of buckles configured to releasably engage a tongue of a corresponding one of the plurality of retractors.

10. The sleeper bunk restraining system of claim 1 wherein the restrainer includes:
    a plurality of retractors configured to be mounted to the vehicle in spaced apart relationship, each of the plurality of retractors including an elongated web having one end connected thereto and an opposite end defining a tongue, and a corresponding plurality of buckles configured to be connected to the vehicle adjacent to the movable portion of the bunk, each of the plurality of buckles configured to releasably engage a tongue of a corresponding one of the plurality of retractors such that one or more of the elongated webs cradle the movable portion of the bunk therein when the buckles engage the tongues.

11. The sleeper bunk restraining system of claim 1 wherein the restrainer includes:

a plurality of retractors configured to be mounted to the vehicle adjacent to the movable portion of the bunk, each of the plurality of retractors including a retractable web having one end connected thereto and an opposite end, a buckle attached to an opposite end of a first one of the retractable webs a fixed-length web having one end attached to a first bracket configured to be mounted to the vehicle and an opposite end attached to a tongue.

a second bracket configured to be mounted to the vehicle in spaced apart relationship to the first bracket, the second bracket slidingly receiving therethrough a second one of the retractable webs connected at its opposite end to the tongue, and a third bracket configured to be mounted to the vehicle in spaced apart relationship to the first and second brackets, the third bracket slidingly receiving therethrough a third one of the retractable webs connected at its opposite end to the tongue, the buckle configured to releasably engage the tongue such that at least the first, second and third retractable webs cradle the movable portion of the bunk therein when the buckle engages the tongue.

12. The sleeper bunk restraining system of claim 11 further including a curtain connected to at least the second and third retractable webs, the curtain defining a connecting end configured to be connected to the first, second and third brackets.

13. The sleeper bunk restraining system of claim 12 further including a curtain housing positioned adjacent to the movable portion of the bunk, the curtain being received within the curtain housing when the connecting end of the curtain is not connected to the first, second and third brackets.

14. The sleeper bunk restraining system of claim 1 wherein the second top surface of the movable portion of the bunk extends generally upwardly and away from the first top surface of the stationary portion when the movable portion is in the occupant restraining position, the first top surface of the stationary portion solely defining the occupant-supporting surface of the bunk when the movable portion is in the occupant restraining position.

15. The sleeper bunk restraining system of claim 1 wherein the movable portion of the bunk is pivotably movable relative to the stationary portion along the length between the first position and the occupant restraining position.

16. The sleeper bunk restraining system of claim 1 wherein the movable portion of the bunk is bendable relative to the stationary portion along the length between the first position and the occupant restraining position.

17. A sleeper bunk restraining system comprising:

a sleeper bunk configured to be carried by a vehicle and defining a length extending generally transverse relative to a direction of travel of the vehicle, the bunk including a stationary portion having a first top surface and a movable portion defined along the length and having a second top surface, the movable portion movable relative to the stationary portion along the length between a first position with the first and second top surfaces together defining an occupant-supporting surface of the bunk and an occupant restraining position with the movable portion forming an occupant restraining barrier relative to the stationary portion for restraining occupant movement toward the direction of travel, and a restrainer including at least one web configured to extend over the stationary portion and engage the movable portion to restrain movement of the movable portion from the occupant restraining position toward the first position when the vehicle is traveling, the at least one web having one end configured to be connected to the vehicle.

18. The sleeper bunk restraining system of claim 17 wherein the second surface of the movable portion of the bunk extends upwardly and away from the first surface of the stationary portion of the bunk when the movable portion of the bunk is in the occupant restraining position.

19. The sleeper bunk restraining system of claim 18 wherein the second surface of the movable portion of the bunk extends generally perpendicular to the first surface of the stationary portion of the bunk when the movable portion of the bunk is in the occupant restraining position.

20. The sleeper bunk restraining system of claim 17 wherein the movable portion of the bunk is pivotable relative to the stationary portion of the bunk along the length between the first and occupant restraining positions.

21. In combination:

a motor vehicle defining a direction of travel, a sleeper bunk configured to be carried by the vehicle and defining a length extending generally transverse relative to the direction of travel, the bunk including a stationary portion having a first top surface and a movable portion defined along the length and having a second top surface, the movable portion movable relative to the stationary portion along the length from a first position with the first and second top surfaces together defining an occupant-supporting surface of the bunk to an occupant restraining position with the movable portion forming an occupant restraining barrier along the length for restraining occupant movement toward the direction of travel, and a restrainer extending over the stationary portion to restrain movement of the movable portion from the occupant restraining position toward the first position when the vehicle is traveling, the restrainer being configured to confine an occupant of the bunk between the stationary portion, the movable portion and the restrainer.

* * * * *